United States Patent
Bing

(10) Patent No.: US 8,254,445 B2
(45) Date of Patent: Aug. 28, 2012

(54) VIDEO TRANSMISSION USING VIDEO QUALITY METRICS

(75) Inventor: Benny Bing, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 400 days.

(21) Appl. No.: 12/581,020

(22) Filed: Oct. 16, 2009

(65) Prior Publication Data

US 2011/0032429 A1    Feb. 10, 2011

Related U.S. Application Data

(60) Provisional application No. 61/231,842, filed on Aug. 6, 2009.

(51) Int. Cl.
*H04N 7/12* (2006.01)

(52) U.S. Cl. ............ 375/240.1; 375/240.26; 375/240.16

(58) Field of Classification Search ................ 375/240.1
See application file for complete search history.

(56) References Cited

U.S. PATENT DOCUMENTS

| | | | |
|---|---|---|---|
| 5,537,446 A | 7/1996 | Lakshman et al. | |
| 6,192,032 B1 | 2/2001 | Izquierdo | |
| 6,803,964 B1* | 10/2004 | Post et al. | 348/423.1 |
| 7,333,515 B1 | 2/2008 | Ramakrishnan et al. | |
| 2007/0036227 A1* | 2/2007 | Ishtiaq et al. | 375/240.26 |
| 2007/0206639 A1 | 9/2007 | Zhao et al. | |
| 2008/0137735 A1* | 6/2008 | Kamariotis et al. | 375/240.03 |
| 2008/0263616 A1 | 10/2008 | Sallinen et al. | |
| 2008/0298467 A1 | 12/2008 | Sallinen et al. | |
| 2009/0041114 A1* | 2/2009 | Clark | 375/240.01 |
| 2009/0097555 A1 | 4/2009 | Baillavoine et al. | |
| 2010/0027663 A1* | 2/2010 | Dai et al. | 375/240.16 |
| 2010/0054333 A1 | 3/2010 | Bing et al. | |
| 2011/0032428 A1 | 2/2011 | Bing | |

FOREIGN PATENT DOCUMENTS

GB    2 447 431 A    9/2008

OTHER PUBLICATIONS

J Rexford, et al., "Online Smoothing of Live, Variable-Bit-Rate Video," Proceedings of the Workshop on Network and Operating System Support for Digital Audio and Video, pp. 249-257, May 1997.
J. Salehi, et al., "Supporting Stored Video: Reducing Rate Variability and End-to-End Resource Requirements through Optimal Smoothing," IEEE Transactions on Networking, vol. 6, No. 4, Aug. 1998, pp. 397-410.

(Continued)

*Primary Examiner* — Jay Patel
*Assistant Examiner* — Jessica Prince
(74) *Attorney, Agent, or Firm* — Merchant & Gould

(57) ABSTRACT

Video traffic transmission using video quality metrics may be provided. A video stream comprising a plurality of frames may be received. For each frame, a determination may be made whether or not to drop the frame rather than saving and/or transmitting it to an end user, thereby conserving network bandwidth. This determination may be made on the basis of a threshold metric, such as a size ratio between frames, an average frame size, an average quality metric.

12 Claims, 7 Drawing Sheets

OTHER PUBLICATIONS

O. Hadar and S. Greenberg, "Statistical Multiplexing and Admission Control Policy for Smoothed Video Streams using e-PCRTT Algorithm", Proceedings of the International Conference on Information Technology: Coding and Computing, pp. 272-277, Mar. 2000.

H.C. Chao, C.L. Hung, Y.C. Chang, and J. L. Chen, "Efficient Changes and Variability Bandwidth Allocation for VBR Media Streams", International Conference on Distributed Computing Systems Workshop, pp. 289-294, Apr. 2001.

U.S. Office Action dated Dec. 21, 2011 cited in U.S. Appl. No. 12/550,698, 13 pgs.

U.S. Office Action dated Jun. 20, 2012 cited in U.S. Appl. No. 12/581,014, 22 pgs.

James D. Salehi et al., "Supporting Stored Video: Reducing Rate Variability and End-to-End Resource Requirements Through Optimal Smoothing," IEEE/ACM Transactions on Networking, vol. 6, No. 4, Aug. 1998, pp. 397-410.

Guohong Cao et al., "Online VBR Video Traffic Smoothing," IEEE, 1999, pp. 502-507.

* cited by examiner

VIDEO TRANSMISSION USING VIDEO QUALITY METRICS

RELATED APPLICATIONS

Under provisions of 35 U.S.C. §119(e), Applicant claims the benefit of U.S. Provisional Application No. 61/231,842, filed Aug. 6, 2009, which is hereby incorporated by reference.

Related U.S. patent application Ser. No. 12/550,698, filed on Aug. 31, 2009, entitled "Video Traffic Bandwidth Prediction," and assigned to the assignee of the present application, is hereby incorporated by reference.

Related U.S. patent application Ser. No. 12/581,014, filed on Oct. 16, 2009, entitled "Video Traffic Smoothing," and assigned to the assignee of the present application, is hereby incorporated by reference.

BACKGROUND

In video distribution systems, encoded video streams may be transmitted over distribution networks such as from a cable provider to a subscriber. Each video stream may require a large amount of bandwidth in order to provide a quality viewing experience to the subscriber. Furthermore, the amount of bandwidth needed may increase as factors such as the resolution and/or frame rate of the video stream increases. In conventional systems, continuing to provide high quality video streams to subscribers may require providers to continually upgrade their networks to make more bandwidth available for transmission of the videos. Any reductions in bandwidth, such as may occur with a high volume of concurrent stream transmissions, may have an adverse effect on the subscriber's viewing experience as the transmission rate may be unable to keep pace with the playback rate causing the video stream playback to pause and/or skip. For example, a constant bit rate (CBR) video stream encoded at a resolution of 320×240 pixels and 24 frames per second (fps) may comprise 468 Kbps of data. Any distribution system that does not allow for a transmission rate of at least 468 Kbps may result in adverse viewing effects while a higher bandwidth may provide an opportunity to buffer video data before it is displayed.

SUMMARY

Consistent with embodiments of the present invention, systems and methods are disclosed for providing video transmission using video quality metrics. Video traffic transmission using quality metrics may be provided. A video stream comprising a plurality of frames may be received. For each frame, a determination may be made whether or not to drop the frame rather than saving and/or transmitting it to an end user. This determination may be made on the basis of a threshold metric, such as a size ratio between frames, an average frame size, an average quality metric.

Both the foregoing general description and the following detailed description are examples and explanatory only, and should not be considered to restrict the invention's scope, as described and claimed. Further, features and/or variations may be provided in addition to those set forth herein. For example, embodiments of the invention may be directed to various feature combinations and sub-combinations described in the detailed description.

DETAILED DESCRIPTION

Figure 1:
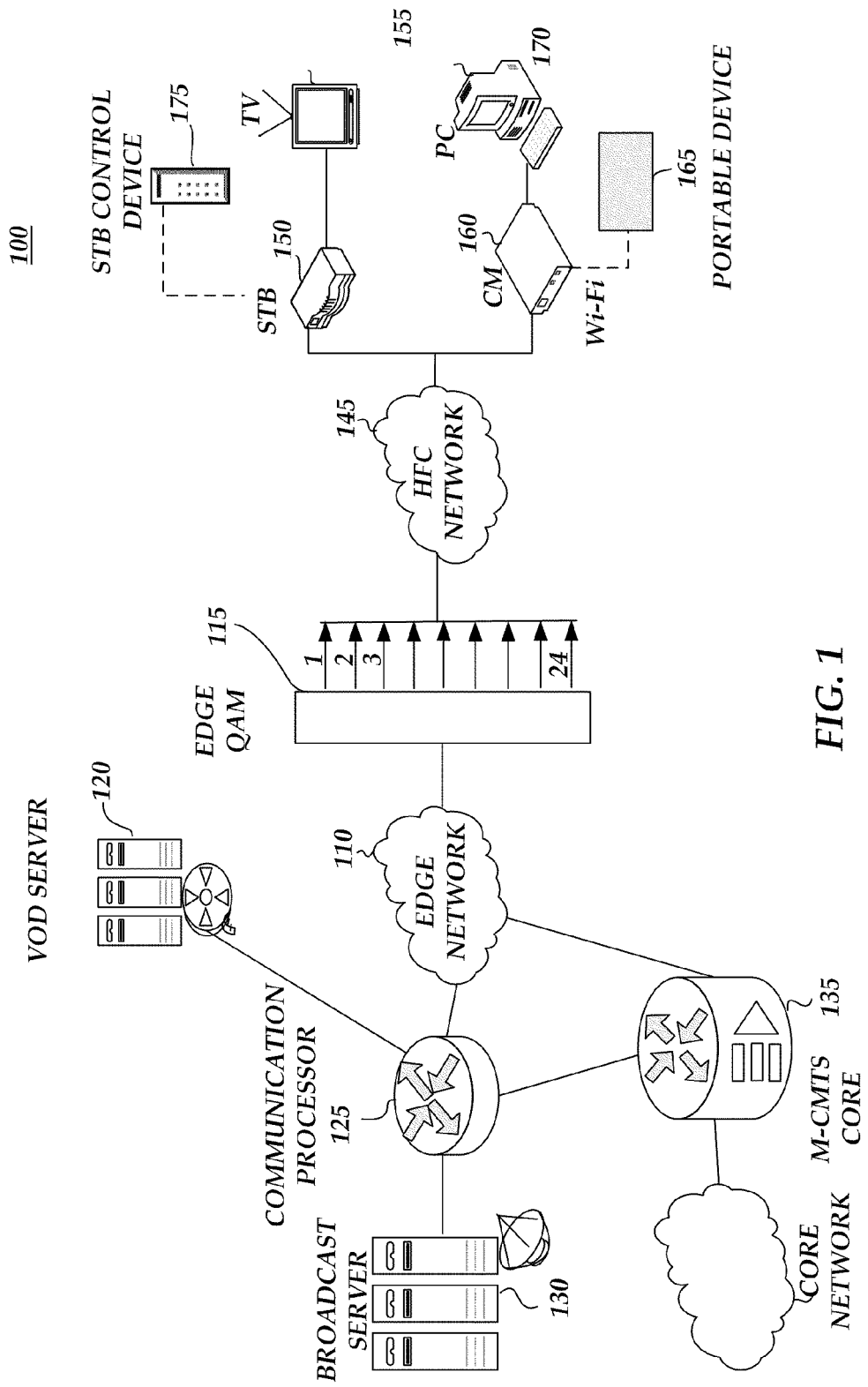
FIG. 1 is a block diagram of a content delivery system.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Service providers may deliver content to users over a content delivery system. This content may be encoded using a variety of compression schemes, and network equipment may provision bandwidth. This provisioning may ensure a smooth flow of data and may minimize interruptions or distortions in the content as provided to a user. The network, however, may be responsible for delivering content to a large number of users, each of which may need to have bandwidth allocated to their chosen programming. For example, two neighbors may each request access to different pay-per-view (PPV) and/or video-on-demand (VoD) content. The content provider may have to balance the bandwidth available to the neighbors in order to provide a quality viewing experience. In conventional systems, this may comprise allocating a static amount of bandwidth to each user for the duration of their requested content. Consistent with embodiments of the invention, video quality metrics may be used to determine a level of bandwidth needed for each video stream. Furthermore, videos may be encoded as a sequence of different frame types, such as I, P, and B-frames. The encoded sequence may contain forward and backward references for the predictive coding of P and B-frames, which can be used to predict these frames when there is a frame loss. This feature may be exploited to selectively drop B-frames to reduce the bandwidth requirements and bit rate variability. Content-independent and/or content-dependent metrics may be used to achieve scalable video transmission.

FIG. 1 is a block diagram of a content delivery system 100. Consistent with embodiments of the present invention, system 100 may comprise an edge network 110, an edge quadrature amplitude modulation (QAM) device 115, a video-on-demand (VOD) server 120, a communication processor 125, a broadcast server 130, a modular cable modem termination system (M-CMTS) core 135, and a core network 140. In addition, system 100 may comprise, a hybrid fiber-coax (HFC) network 145, a set-top-box (STB) 150, a television (TV) 155, a cable modem (CM) 160, a portable device 165, a personal computer (PC) 170, and a STB control device 175. Communications processor 125 will be discussed in greater detail below with respect to FIG. 2.

Edge network 110 may comprise, a network providing, for example, full-duplex, two-way broadband services including broadband video and audio, cable television services, or telecommunications services. Edge network 110 may provide data by utilizing network data formats including, for example, i) Internet protocol (IP); ii) Ethernet; iii) digital subscriber line (DSL); iv) asynchronous transfer mode (ATM); and v) virtual private network (VPN). Edge network 110 may utilize managed network services. Edge network 110 may comprise various components including, for example, i) servers; ii) switches; iii) routers; iv) gateways; v) hubs; vi) fiber optic cable; vii) copper cable; and viii) terminations. The aforementioned are examples and edge network 110 may comprise other configurations for broadband service delivery and data switching over system 100. Consistent with embodiments of the invention, edge network 110 may be operative to allocate and schedule upstream and/or downstream bandwidth for two-way data transmission between video processor 125 and user devices connected to HFC network 145, such as STB 150 and cable modem 160.

Edge QAM 115 may provide modulation for various encoding formats (e.g. for data, audio, and video) and may distribute the signal down multiple broadband channels. Edge QAM 115 may modulate signals in, for example, multi-channel quadrature amplitude modulation. Edge QAM 115 may support broadcast and narrowcast with multi-program transport stream (MPTS) pass-through and single-program transport stream (SPTS) to MPTS multiplexing. Edge QAM 115 may meet data-over-cable service interface specification (DOCSIS) and downstream radio frequency interface (DRFI) performance specifications. Furthermore, edge QAM 115 may provide video over internet protocol and moving pictures expert group (MPEG) video simultaneously. Edge QAM 115 may provide various data switching functions and enable two-way, full-duplex communication within the broadband network. Edge QAM 115 may modulate and distribute broadcast multimedia services including, for example, i) a broadcast multi-media service; ii) a high-definition multimedia service; iii) a digital television multimedia service; iv) an analog multimedia service; v) a VOD service; vi) a streaming video service; vii) a multimedia messaging service; viii) a voice-over-internet protocol service (VoIP); ix) an interactive multimedia service; and x) an e-mail service. The aforementioned are examples and edge QAM 115 may comprise other configurations for different broadband and data services.

VOD server 120 may perform processes for providing video entertainment on demand. VOD server 120 may take MPEG compressed video off a hard disk or a networked service, format it into MPEG-TS packets inside a user datagram protocol (UDP) packet, and send it into edge network 110. Edge QAM 115 may receive the UDP packets, where Internet protocol (IP) encapsulation may be removed. The MPEG packets may be forwarded down one QAM channel on edge QAM 115 and onto HFC network 145.

Edge network 110 and HFC network 145 may comprise non-limiting, example communication networks for the transmission of video streams from a content provider to a user. Other examples may comprise DOCSIS networks, digital subscriber line (DSL) networks, wireless networks, and/or any other communication medium.

Broadcast server 130 may perform processes for providing broadcast services. Broadcast server 130 may use a broadcast signal and a narrowcast signal to deliver broadcast services to a broadcast system. Broadcast server 130 may receive video, audio, and data from fiber optic input, wireless input, recorded tape, recorded digital video disc, or satellite input. Broadcast server 130 may utilize digital signal formats and analog signal formats. Furthermore, broadcast server 130 may comprise a specialized receiver and data switching equipment for broadband distribution. In addition, broadcast server 130 may provide broadband multimedia services including, for example, i) the broadcast multi-media service; ii) the high-definition multimedia service; iii) the digital television multimedia service; iv) the analog multimedia service; v) the VOD service; vi) the streaming video service; vii) the multimedia messaging service; viii) the voice-over-internet protocol service (VoIP); ix) the interactive multimedia service; and x) the e-mail service. The aforementioned are examples and broadcast server 130 may comprise other components and systems for providing broadcast services in system 100.

M-CMTS core 135 may receive IP datagrams from core network 140. M-CMTS core 135 may then forward these IP datagrams to either a single QAM channel within edge QAM 115 with traditional DOCSIS encapsulation, or may forward the IP datagrams to multiple QAM channels within edge QAM 115, for example, using DOCSIS bonding. M-CMTS core 135 may support DOCSIS features and end-to-end IP within a next generation network architecture (NGNA), for example.

Core network 140 may comprise any data or broadband network that may provide data and services to edge network 110, communications processor 125, broadcast server 130, or M-CMTS core 135. For example, core network 140 may comprise the Internet. In addition, core network 140 may comprise various components including, for example, i) servers; ii) switches; iii) routers; iv) gateways; v) hubs; vi) fiber optic cable; vii) copper cable; and viii) terminations. The aforementioned are examples and core network 140 may comprise other components and may supply other services using various other formats.

HFC network 145 may comprise a communications network (e.g. a cable TV network) that uses optical fiber, coaxial cable, or an optical fiber coaxial cable combination. Fiber in HFC network 120 may provide a high-speed backbone for broadband services. Coaxial cable may connect end users in HFC network 120 to the backbone. Such networks may use, for example, matching DOCSIS cable modems at a head end and at an end user's premises. Such a configuration may provide bi-directional paths and Internet access.

STB 150 may comprise a single component or a multi-component system for receiving broadband services. STB 150 may comprise a service consumer system combining several components including, for example, a set top box, cable modem 160, a network interface unit, a residential gateway, a terminal unit, a scrambler/descrambler, a digital storage media unit, an input/output port, a display device, a keyboard, and a mouse. STB 150 may encode and decode digital and analog signals, provide a memory buffer for storing incoming and/or outgoing data, and provide interface capability for other components. STB 150 may utilize various operating systems and other software components. The end user's premises may contain STB 150. STB 150 may include all the functionality provided by a cable modem, such as CM 160, in one component and attach to TV 155, for example.

TV 155 may comprise an end use device for displaying delivered broadband services. TV 155 may comprise, for example, a television, a high definition television (HDTV), a broadband or Internet-enabled TV, a smartphone, a liquid crystal display unit (LCD), a video projection unit, laptop, or PC 170. The aforementioned are examples and TV 155 may comprise other display devices for delivered broadband services.

CM 160 may comprise, for example, a cable modem, a network server, a wireless fidelity data switch, or an Ethernet switch. CM 160 may provide data services to the user by accessing DOCSIS services from system 100. CM 160 may provide Internet access, video, or telephone services. The aforementioned are examples and CM 160 may comprise other data delivery devices.

Portable device 165 or PC 170 may comprise any personal computer, network switch, wireless switch, network hub, server, personal digital assistant, and home computing device. Portable device 165 or PC 170 may serve as user devices for data access from system 100. Portable device 165 and PC 170 may transmit and receive data and services from system 100.

STB control device 175 may comprise any input and output device for interfacing with STB 150 or TV 155. For example, STB control device 175 may be a remote control for using STB 150. STB control device 175, after proper programming, may interface with STB 150.

Embodiments consistent with the invention may comprise a system for predicting video traffic bandwidth requirements. The system may comprise a memory storage and a processing unit coupled to the memory storage. The processing unit may be operative to process video data encoded in a compression scheme, such as MPEG-2 and/or MPEG-4. The processing unit may predict the size of subsequent data frames of a content stream and may allocate bandwidth in edge network 110 and/or HFC network 145 accordingly. The processing unit may also be operative to share its predicted sizes and/or bandwidth requirements with components of edge network 110 and/or HFC network 145 operative to control and/or allocate bandwidth resources.

Consistent with embodiments of the present invention, the aforementioned memory, processing unit, and other components may be implemented in a content delivery system, such as system 100 of FIG. 1. Any suitable combination of hardware, software, and/or firmware may be used to implement the memory, processing unit, or other components. By way of example, the memory, processing unit, or other components may be implemented with communications processor 125, in combination with system 100. The aforementioned system and processors are examples and other systems and processors may comprise the aforementioned memory, processing unit, or other components, consistent with embodiments of the present invention.

Figure 2:
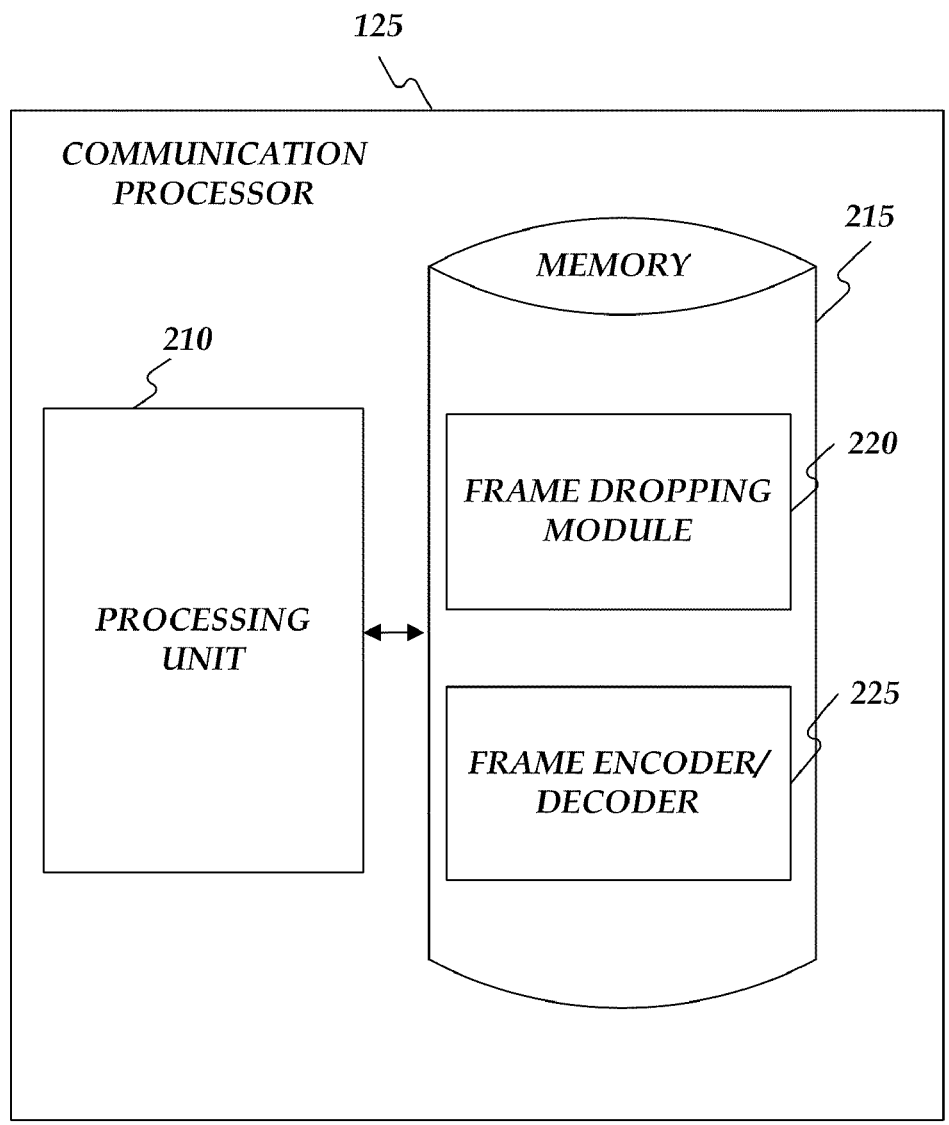
FIG. 2 is a block diagram of a communication processor.

FIG. 2 shows communications processor 125 of FIG. 1 in more detail. As shown in FIG. 2, communications processor 125 may include a processing unit 210 and a memory unit 215. Memory 215 may include a frame dropping module 220 and a frame encoder/decoder 225. While executing on processing unit 210, frame dropping module 220 may perform processes for providing rate smoothing in video transmission, including, for example, one or more stages included in method 400 described below with respect to FIG. 4. Furthermore, frame dropping module 220 and frame encoder/decoder 225 may be executed on or reside in any element shown and/or described with respect to FIG. 1. Moreover, any one or more of the stages included in method 300 may be performed on any element shown in FIG. 1 including, but not limited to, VoD server 120, broadcast server 130, edge network 110, edge QAM 115, HFC network 145, STB 150, TV 155, CM 160, PC 170, or portable device 165.

Communications processor 125 ("the processor") may be implemented using a personal computer, a network computer, a mainframe, or other similar microcomputer-based workstation. The processor may comprise any computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, a wireless fidelity (Wi-Fi) access point, or a facsimile machine. The aforementioned systems and devices are examples and the processor may comprise other systems or devices.

Encoding schemes such as MPEG-2 and MPEG-4 may compress video frame data for transmission over a network. Each picture element of a frame, or pixel, may be represented by one luma number and two chrominance numbers comprising the brightness and color of the pixel. These pixel representations, in HDTV, for example, may comprise a raw video stream of 149,299,200 bytes per second for 24 fps video. The actual transmission size may vary depending on a number of factors such as the frame rate, resolution, and compression scheme. Much of the data from frame to frame may be redundant, however, such as where a scene of a person talking changes little from frame to frame apart from the person's mouth movements.

Figure 3:
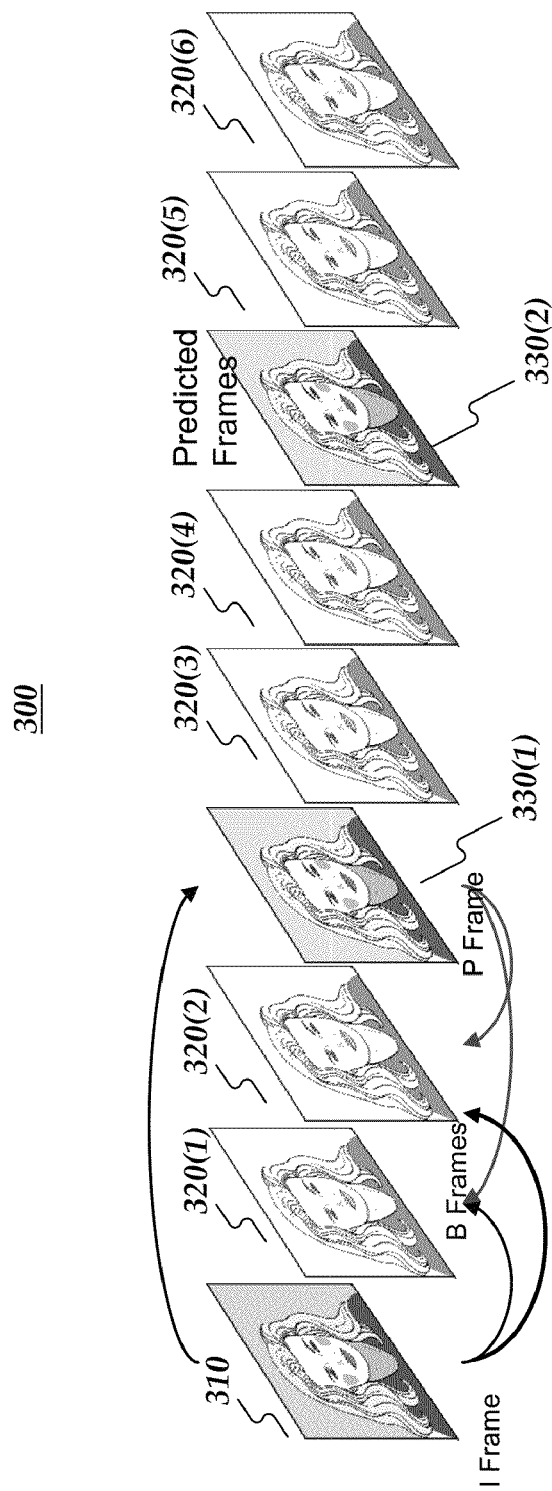
FIG. 3 is an example illustration of a Group of Pictures interval.

FIG. 3 is an example illustration of a Group of Pictures (GOP) interval 300 that may be used in the MPEG encoding schemes to compress the raw video stream. A GOP may comprise a number of frames of video, typically 8, 12, or 16 frames per group. GOP 300 may comprise a partial group for illustration purposes, and may comprise an intra-coded frame (I-frame) 310, a plurality of bidirectionally-predictive-coded frames (B-frames) 320(1)-320(6), and a plurality of predictive-coded frames (P-frames) 330(1)-330(2). I-frame 310 may comprise a compressed version of a single uncompressed (raw) frame. It may take advantage of spatial redundancy and of the inability of the eye to detect certain changes in the image from a previous frame. Unlike P-frames and B-frames, I-frames do not depend on data in the preceding or the following frames. However, because the compression algorithm may exclude pixel data that may be considered redundant from a previous frame, an I-frame may not include data for every pixel of the frame. Thus, the size of I-frames may vary over the course of a video stream. For example, an I-frame representing part of the same visual scene as the immediately previous frame may be much smaller in size than an I-frame representing an entirely new and different frame.

During compression, using the MPEG-2 codec for example, the raw frame may be divided into 8 pixel by 8 pixel blocks. The data in each block may be transformed by a discrete cosine transform resulting on an 8 by 8 matrix of coefficients. The transform may convert spatial variations into frequency variations, but it does not change the information in the block; the original block may be recreated by applying the inverse cosine transform. The frame image may be simplified by quantizing the coefficients and compressing the matrix. Depending on the encoding scheme, every Nth frame is made into an I-frame. P-frames and B-frames might follow an I-frame like this, IBBPBBPBBPBB(I), to form a Group Of Pictures (GOP). The number of frames per interval is variable, and may change over the course of a video stream and/or vary according to a modulation scheme used to transmit the stream. A default GOP size for NTSC modulation may comprise 15 or 16, for example, while PAL modulation may comprise a GOP size of 12. A GOP may also end early in order to encode the first frame of a new scene as an I-frame.

P-frames may provide more compression than I-frames because they take advantage of the data in the previous I-frame or P-frame. I-frames and P-frames may be referred to as reference frames, and consistent with embodiments of the invention, B-frames may also be used as reference frames. To generate a P-frame, the previous reference frame is reconstructed. The frame being compressed may be divided into 16 pixel by 16 pixel macroblocks. Then, for each of those macroblocks, the reconstructed reference frame may be searched to find that 16 by 16 macroblock that best matches the macroblock being compressed. The offset may be encoded as a motion vector. The offset is zero, but, if something in the picture is moving, the offset might be something like 23 pixels to the right and 4 pixels up. If no suitable match is found, the macroblock may be treated like an I-frame macroblock and encoded as a whole. The processing of B-frames is similar to that of P-frames except that B-frames may use the picture in the following reference frame as well as the picture in the preceding reference frame. As a result, B-frames may provide more compression than P-frames.

Figure 4:
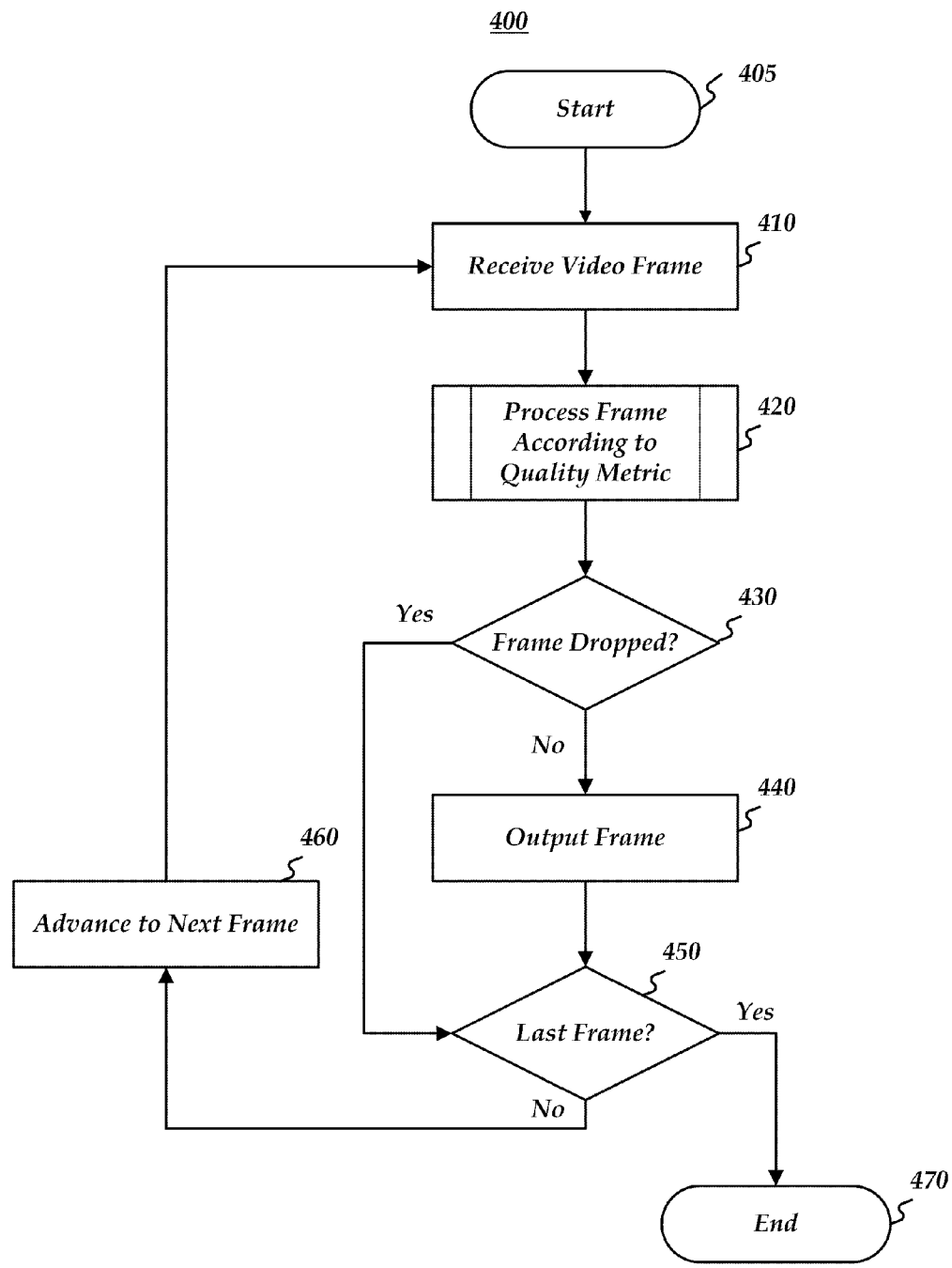
FIG. 4 is a flow chart of a method for providing video transmission using a video quality metric.

FIG. 4 is a flow chart of a method 400 for providing video transmission using video quality metrics. Method 400 may by implemented using communication processor 125 as described above with respect to FIGS. 1 and 2. Ways to implement the stages of method 400 will be described in greater detail below. Method 400 may begin at starting block 405 and proceed to stage 410 where communication processor 125 may receive a video stream comprising a plurality of frames. For example, communication processor 125 may receive an MPEG-4 encoded video stream comprising frames of different types, such as I-frames, P-frames, and B-frames.

From stage 410, method 400 may advance to stage 420, where communication processor 125 may process each frame according to a video quality metric algorithm. The algorithm may determine whether or not to drop a given frame in order to reduce to overall data size of the video stream and thus reduce the bandwidth needed to transmit the video stream. A video stream provider may choose any of a variety of video quality metrics to make the determination of whether to drop the frame, and example algorithms are described in greater detail below with respect to FIGS. 5A-5C.

From stage 420, method 400 may advance to stage 430, where communication processor 125 may determine whether the video quality metric algorithm dropped the frame. If not, method 400 may advance to stage 440 where communication processor 125 may output the frame. For example, the frame may be written to a file comprising the non-dropped video frames of the video stream. This file may comprise a master file that may be copied and/or read when a user requests access to the video stream. Thus, the video quality metric algorithm may only need to be executed for a given video stream once. Consistent with embodiments of the invention, the video quality metric algorithm may be executed on the fly each time the video stream is accessed and transmitted, and the output of the frame may comprise transmission of the frame to an end user for decoding and/or display, such as by STB 150 and/or TV 155.

After the frame is output at stage 440 or if, at stage 430, communication processor 125 determines that the frame has been dropped, method 400 may advance to stage 450 where communication processor 125 may determine whether the frame comprises the last frame of the video stream. If not, method 400 may advance to stage 460 where communication processor may advance to the next frame and return to stage 410 for processing of that next frame. Otherwise, method 400 may end at stage 470.

Figure 5A:
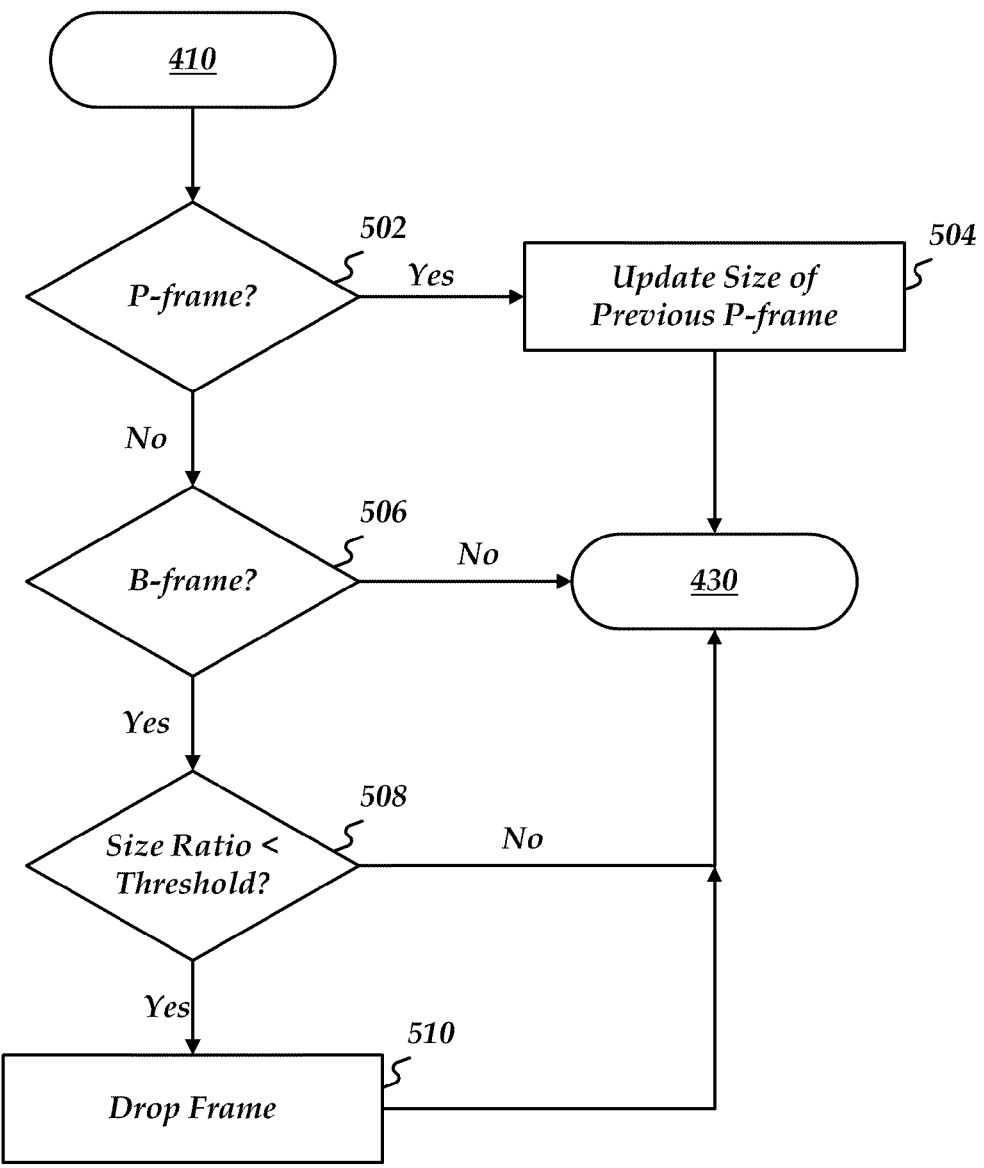
FIGS. 5A-5C are flow charts of subroutines of a method for providing video transmission using a video quality metric.

FIG. 5A comprises a first subroutine 500 that may comprise the video quality metric algorithm of stage 420 of method 400. As B-frames may be reconstructed using the information from the two closest P-frames in the encoded MPEG sequence, the ratio of the size of the B-frame and the previous P-frame may be indicative of the amount of information contained in a given B-frame that is required for the reconstruction of the original frame. A low ratio may indicate that a loss of this B-frame may not cause significant loss of encoded information during reconstruction and hence, may be used as a metric for determining whether to drop the B-frame.

Subroutine 500 may begin at stage 502 where communication processor 125 may determine whether the frame being processed comprises a P-frame type. If so, subroutine 500 may advance to stage 504 where a variable storing a size of the most recent P-frame may be updated to store the size of the current frame. Subroutine 500 may end and return to stage 430 without dropping the frame.

Otherwise, subroutine 500 may advance to stage 506 where communication processor 125 may determine whether the current frame is a B-frame. If not, such as if the frame is an I-frame, subroutine 500 may end and return to stage 430. If the current frame is a B-frame, subroutine 500 may advance to stage 508 where communication processor may determine whether a size ratio of the current B-frame to the most recent P-frame is less than a threshold level. For example, a threshold level may be set to 10%. If the size of the B-frame is less than 10% of the size of the most recent P-frame, subroutine 500 may advance to stage 510 where communication processor 125 drop the current frame. Subroutine 500 may then end and return to stage 430 of method 400.

Figure 5B:
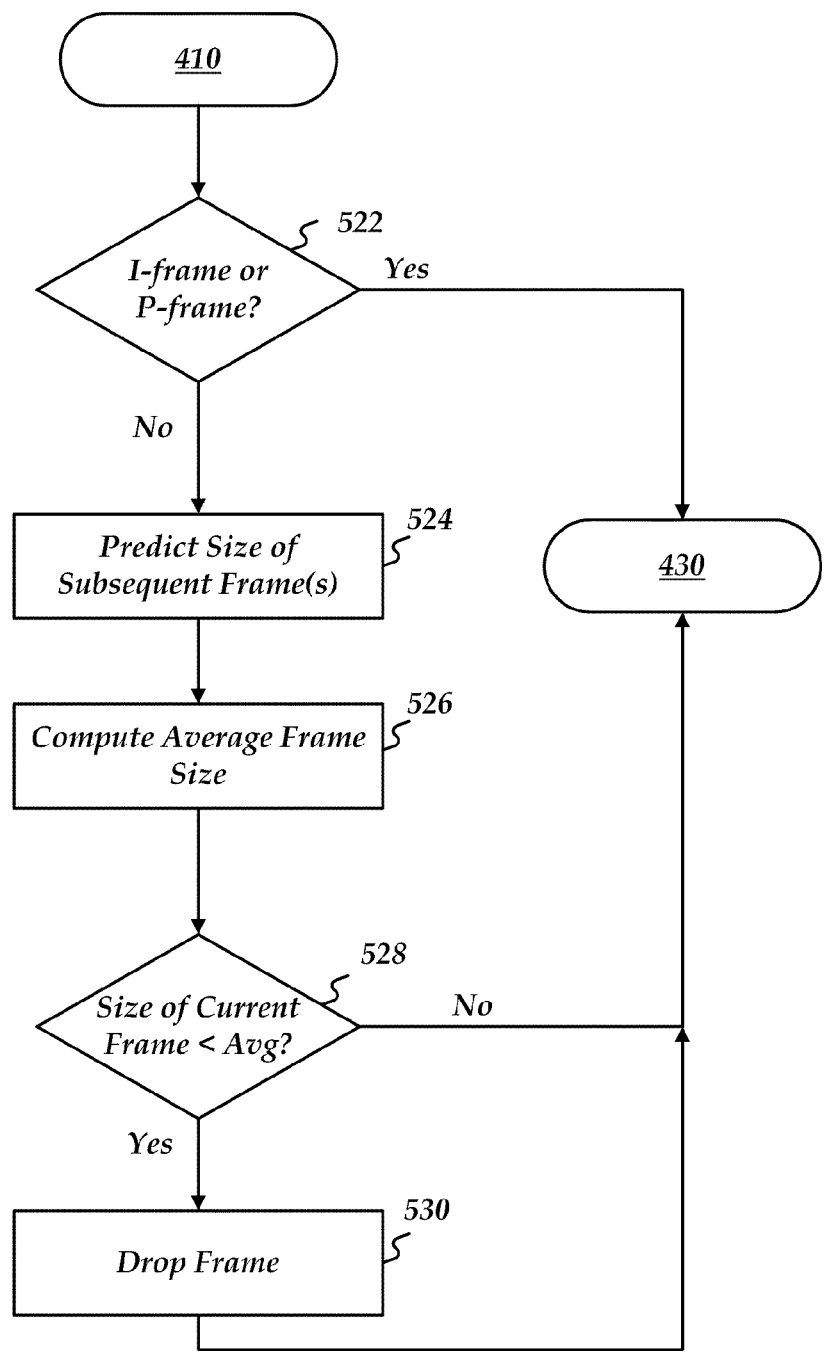

FIG. 5B comprises a second subroutine 520 that may comprise the video quality metric algorithm of stage 420 of method 400. B-frames, as per the MPEG-4 standards, may be dependent on both the previous and subsequent frames in the encoded sequence. A prediction algorithm may be employed to determine the possible sizes for the future frames. Such a size prediction algorithm is described in co-pending, related application having Ser. No. 12/550,698, entitled "Video Traffic Bandwidth Prediction," and assigned to the assignee of the current application, hereby incorporated by reference in its entirety. A linear traffic model may be used to predict the sizes of future frames based on the sizes of the previous frames. For example, the size of previous B-frame values (including the current one) may be combined with the possible predicted sizes of future B-frames. These sizes may represent a content-independent metric. The current B-frame may be dropped if the size of the B-frame is smaller than the average of the previous and the predicted B-frames. The size of the B-frame may be included as part of future prediction calculations for subsequent B-frames irrespective of whether it is dropped or not.

Subroutine 520 may begin at stage 522 where communication processor 125 may determine whether the current frame comprises an I-frame or a P-frame. If so, subroutine 520 may end return to stage 430 of method 400 without dropping the frame. Otherwise, subroutine 520 may advance to stage 524 where communication processor 125 may predict a size for at least one subsequent frame. For example, communication processor 125 may apply a linear traffic model based on previous frames to predict the size of future frames. Consistent with embodiments of the invention, the size of multiple subsequent frames may be predicted.

From stage 524, subroutine 520 may advance to stage 526 where communication processor 125 may compute an average frame size. For example, communication processor may compute the average size of at least one previous B-frame, the current B-frame, and at least one predicted subsequent B-frame. Consistent with embodiments of the invention, multiple previous and/or subsequent frames may be used to compute the average. For example, 5 known frame sizes, which may include the current frame, may be averaged with the predicted sizes of the next 5 subsequent B-frames.

After computing the average frame size of a subset of the frames of the video stream, subroutine 520 may advance to stage 528 where communication processor 125 may determine whether the size of the current frame is less than the computed average frame size. If so, subroutine 520 may advance to stage 530 where communication processor 125 may drop the current frame. Afterwards, or if the size of the current frame is not less than the computed average frame size, subroutine 520 may end and return to stage 430 of method 400.

Figure 5C:
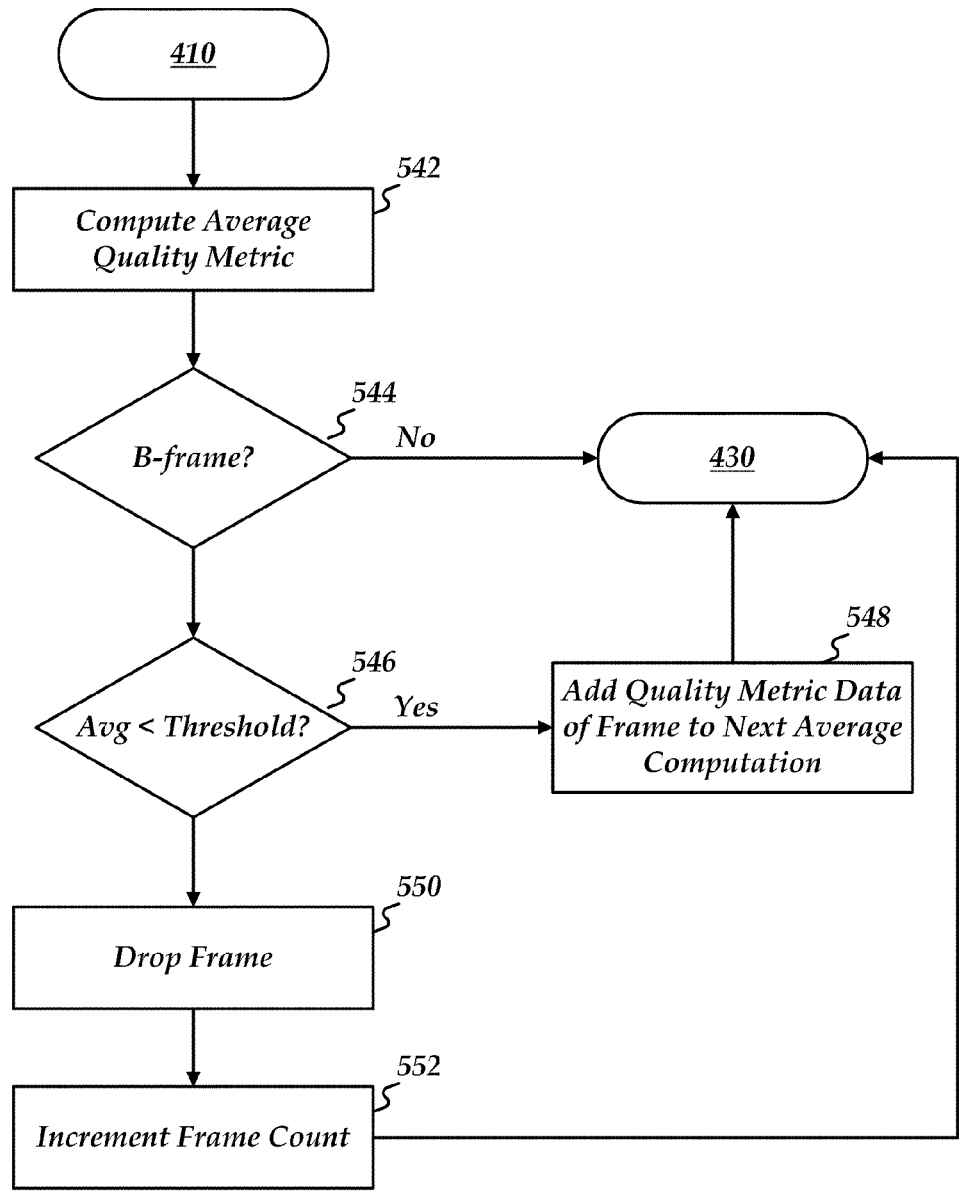

FIG. 5C comprises a third subroutine 540 that may comprise the video quality metric algorithm of stage 420 of method 400. In third subroutine 540, a quality metric may be computed for each frame of the video stream. A running average of the computed quality metrics may be maintained as each new frame is received. When each B-frame arrives, communication processor 125 may determine whether the current average quality metric is less than a preset threshold. If so, the current B-frame may be included as part of the output; otherwise the current B-frame may be dropped. If the frame is included, its computed quality metric may be included as a part of the average. If the current frame is dropped, the frame count used to compute the average may be incremented, but the computed quality metric may not be included in the average metric calculations (i.e., its value is taken as zero since the B-frame is dropped).

The quality metric may comprise any of a number of calculations. For example, the metric may comprise a relative peak signal to noise ratio (rPSNR) and/or a structural similarity index (SSIM). The rPSNR may comprise a content-dependent metric regarding a quality of reconstruction of a compressed image. The signal may comprise is the original data, while the noise may comprise the error introduced by the compression algorithm (e.g., MPEG-4). SSIM comprises another content-dependent method for measuring the similarity between two images (e.g., the original frame and the frame as it appears after encoding and decoding).

Subroutine 540 may begin at stage 542 where communication processor 125 may compute an average quality metric of previously received frames of the video stream. For example, communication processor may sum an rPSNR value for each previously received frame that was not dropped divided by a total count of received frames (including dropped frames).

From stage 542, subroutine 540 may advance to stage 544 where communication processor 125 may determine whether the current frame is a B-frame. If not, subroutine 540 may end and return to stage 430 of method 400. Otherwise, subroutine 544 may advance to stage 546 where communication processor 125 may determine whether the average quality metric computed at stage 542 is less than a threshold value. For example, when using rPSNR as a quality metric, the average may be computed in dB and the threshold level may be established at 30 dB. SSIM metric values may be computed as a decimal value between 0 and 1, and the threshold level may be defined as 0.75.

If, at stage 546, communication processor 125 determines that the average metric is over the predefined threshold, subroutine 540 may advance to stage 550 where communication processor 125 may drop the current frame. Subroutine 540 may then proceed to stage 552, where communication processor 125 may increment the frame count used to compute the average metric before returning to stage 430 of method 400.

If communication processor 125 determines, at stage 546, that the average metric is less than the threshold, subroutine 540 may advance to stage 548 where communication processor 125 may add the quality metric data of the current frame to the data used to compute the average quality metric. For example, if the rPSNR of the current frame is computed as 32 dB and the current average metric is 34.087 dB over 50 frames, the next average computation at stage 542 may factor in the 32 dB rPSNR over a count of 51 frames, resulting in a new computed average of 34.046 dB. Subroutine 540 may then end and return to stage 430 of method 400.

A single video stream may be processed according to any and/or all of the above subroutines. Consistent with embodiments of the invention, a stream may be processed by each subroutine individually and the resulting files compared for size and/or quality. Table 1, below, lists some sample video files and the resulting file sizes after being processed by second subroutine 520, third subroutine 540, and with various threshold ratio levels for first subroutine 500.

TABLE 1

| Encoding Method | Foreman (300 frames) | Coastguard (300 frames) | Highway (2000 frames) | Bridge (2100 frames) |
| --- | --- | --- | --- | --- |
| Uncompressed | 11.264 MB | 11.264 MB | 74.752 MB | 78.848 MB |
| MPEG-4 | 625 KB | 859 KB | 4.198 MB | 2.458 MB |
| No B-Frames | 481 KB | 694 KB | 3.174 MB | 2.150 MB |
| Subroutine 520 | 482 KB | 738 KB | 3.200 MB | 2.253 MB |
| Subroutine 540 | 498 KB | 745 KB | 3.277 MB | 2.280 MB |
| Subroutine 510: 5% P-frame ratio | 622 KB | 858 KB | 4.198 MB | 2.458 MB |
| Subroutine 510: 10% P-frame ratio | 617 KB | 848 KB | 4.198 MB | 2.355 MB |
| Subroutine 510: 15% P-frame ratio | 594 KB | 746 KB | 4.096 MB | 2.180 MB |
| Subroutine 510: 20% P-frame ratio | 550 KB | 718 KB | 3.789 MB | 2.150 MB (No B) |
| Subroutine 510: 25% P-frame ratio | 511 KB | 707 KB | 3.379 MB | |
| Subroutine 510: 30% P-frame ratio | 487 KB | 698 KB | 3.277 MB | |
| Subroutine 510: 35% P-frame ratio | 483 KB | 696 KB | 3.174 MB (No B) | |
| Subroutine 510: 40% P-frame ratio | 481 KB (No B) | 694 KB (No B) | | |

An embodiment consistent with the invention may comprise a system for providing video traffic smoothing. The system may comprise a memory storage and a processing unit coupled to the memory storage. The processing unit may be operative to receive a plurality of frames of a video stream and determine whether to discard each frame as it is processed. The determination may be based on the type of frame, a ratio of size between each current frame and a previous frame, an average size of previous and/or predicted subsequent frames, and/or an average quality metric of previous frames. If the frame is not dropped, it may be output, such as by writing the frame to a file, transmitting the frame over a network, and/or decoding the frame for display on a display device.

Another embodiment consistent with the invention may comprise a system for providing video traffic smoothing. The system may comprise a communication processor comprising a memory storage coupled to a processing unit, wherein the processing unit may be operative to receive a video stream comprising a plurality of frames, determine whether to discard at least one of the plurality of frames according to a video quality metric, and, in response to determining not to discard at least one of the plurality of frames, send the frame to an output.

Yet another embodiment consistent with the invention may comprise a system for providing video traffic smoothing. The system may comprise a memory storage and a processing unit coupled to the memory storage. The processing unit may be operative to receive a video stream comprising a plurality of frames, determine whether to discard at least one of the plurality of frames according to a video quality metric, and, in response to determining not to discard at least one of the plurality of frames, send the frame to an output. The processor may be further operative to compute an average quality metric of a subset of the plurality of frames, wherein the subset of the plurality of frames comprises each of the frames of the video stream prior to the at least one frame and determine whether the average quality metric of the subset of the plurality of frames is less than a threshold level. If the average quality metric is less than the threshold level, the data associated with a quality metric of the current frame may be included in future average computations. Otherwise, the frame may be discarded while the frame count used to compute the average may be incremented.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for transmitting video using a quality metric, the method comprising:
    receiving a video stream comprising a plurality of frames; and
    determining whether to discard at least one of the plurality of frames, wherein determining whether to discard the at least one of the plurality of frames comprises:
        computing a ratio of a size of the at least one of the plurality of frames to a size of at least one previous frame of the plurality of frames being previous to the at least one of the plurality of frames;
        determining whether the ratio is less than a threshold level; and
        in response to determining that the ratio is less than the threshold level, discarding the at least one of the plurality of frames.

2. The method of claim 1, wherein receiving the video stream comprises receiving the video stream wherein the received video stream is encoded according to at least one of the following formats: MPEG-1, MPEG-2, and MPEG-4.

3. The method of claim 1, further comprising identifying a type of the at least one of the plurality of frames, wherein the type comprises at least one of the following: an I-frame, a P-frame, and a B-frame.

4. The method of claim 1, wherein computing the ratio comprises computing the ratio wherein the at least one previous frame comprises a different type than the at least one of the plurality of frames.

5. A system for transmitting video using a quality metric, the system comprising:
    a memory storage; and
    a processing unit coupled to the memory storage, wherein the processing unit is operative to:
        receive a video stream comprising a plurality of frames; and
        determine whether to discard at least one of the plurality of frames,
    wherein the processing unit being operative to determine whether to discard the at least one of the plurality of frames comprises the processing unit being operative to:
        compute a ratio of a size of the at least one of the plurality of frames to a size of at least one previous frame of the plurality of frames being previous to the at least one of the plurality of frames;
        determine whether the ratio is less than a threshold level; and
        in response to the processing unit determining that the ratio is less than the threshold level, discard the at least one of the plurality of frames.

6. The system of claim 5, wherein the received video stream is encoded according to at least one of the following formats: MPEG-1, MPEG-2, and MPEG-4.

7. The system of claim 5, wherein the processing unit is further operative to identify a type of the at least one frame of the plurality of frames, wherein the type comprises at least one of the following: an I-frame, a P-frame, and a B-frame.

8. The system of claim 5, wherein the at least one previous frame comprises a different type than the at least one of the plurality of frames.

9. A non-transitory computer readable storage medium device that stores a set of instructions which when executed perform a method for transmitting video using a quality metric, the method executed by the set of instructions comprising:
    receiving a video stream comprising a plurality of frames; and
    determining whether to discard at least one of the plurality of frames, wherein determining whether to discard the at least one of the plurality of frames comprises:
        computing a ratio of a size of the at least one of the plurality of frames to a size of at least one previous frame of the plurality of frames being previous to the at least one of the plurality of frames;
        determining whether the ratio is less than a threshold level; and
        in response to determining that the ratio is less than the threshold level, discarding the at least one of the plurality of frames.

10. The non-transitory computer-readable storage medium device of claim 9, wherein receiving the video stream comprises receiving the video stream wherein the received video stream is encoded according to at least one of the following formats: MPEG-1, MPEG-2, and MPEG-4.

11. The non-transitory computer-readable storage medium device of claim 9, further comprising identifying a type of the at least one of the plurality of frames, wherein the type comprises at least one of the following: an I-frame, a P-frame, and a B-frame.

12. The non-transitory computer-readable storage medium device of claim 9, wherein computing the ratio comprises computing the ratio wherein the at least one previous frame comprises a different type than the at least one of the plurality of frames.

* * * * *